United States Patent Office 3,410,305
Patented Nov. 12, 1968

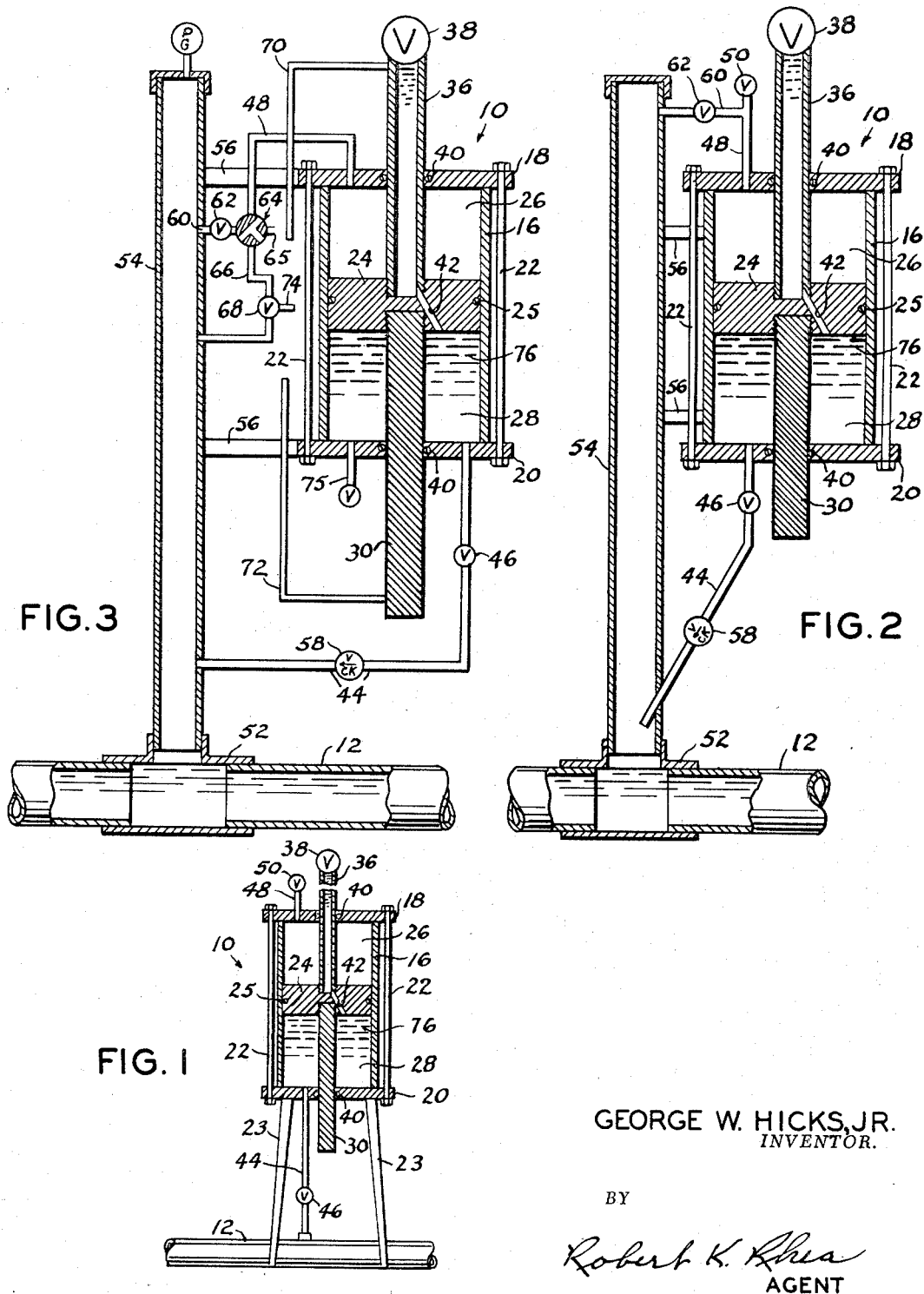

3,410,305
CHEMICAL INJECTOR
George W. Hicks, Jr., P.O. Box 11052,
Oklahoma City, Okla. 73111
Filed Mar. 25, 1966, Ser. No. 537,423
3 Claims. (Cl. 137—564.5)

ABSTRACT OF THE DISCLOSURE

A piston divided upright chemical containing housing is supported by a gas tight tank in turn connected with an oil and gas containing flow line. Coaxially aligned diametrically equal piston rods project outwardly of respective ends of the housing. Tubing connects respective ends of the housing to the tank. Gravitational attraction for the piston and equalized gas pressure in the housing chambers forces chemical out of the depending chamber through a feed valve in the tubing forming a drain line.

---

The present invention relates to chemical injectors for oil well lead lines and is an improvement over U.S. Patent No. 3,109,452, issued to me Nov. 5, 1963, for Chemical Injector.

Most pumping oil wells produce a combination of oil, water and gas, wherein a large proportion of the oil produced is mixed with the water which forms an emulsion. The water component produced by oil wells has no economic valve and it is desirable to separate the water from the well fluids prior to the storage and processing of the oil. Oil wells are conventionally pumped by means of a reciprocating sucker rod type pump which tends to thoroughly mix the oil, basic sediment and water produced by the well from the various producing strata thereby creating the emulsion of oil and water. This emulsion is of such consistency that the oil and water are not easily separated without the addition and mixing with a chemical referred to herein as an emulsioin breaker.

It is common practice to inject a conventional emulsion breaker into the fluid containing flow lines of oil wells adjacent the well head which facilitates separation of the oil and water by gravity in a separating tank located remotely from the well head. It has been common practice to inject such an emulsion breaker by means of a mechanically driven pump actuated by the oil well power surface unit which operates the pump. This type of chemical injector ordinarily has a reservoir of limited size and frequently gets out of order due to their constant operation and delicate structure thereby requiring frequent attention and repair or replacement.

The device disclosed in the above referred to patent operates satisfactorily only when sufficient gas pressure is available from the flow line for creating a pressure differential on opposing sides of the piston to actuate the piston. One objection to the device disclosed therein is that the variations of gas pressure produced by the well and present in the gas-tight tank, results in an undesirable fluctuation of the rate of flow of the emulsion breaker. Furthermore that device does not include facilities for ease in manually filling the device with emulsion breaker or the operation of a simplified version in connection with a "stripper" oil well flow line producing very little, if any, gas.

It is, therefore, the principal object of this invention to provide a device for adding an emulsion breaker chemical to well fluids being pumped through a flow line.

Another important object is to provide a device of this class to insure a positive flow of emulsion breaker into the well fluids of a flow line without the use of mechanical or gas actuated moving parts.

Another object is to provide a chemical injector which employs a gravity actuated piston for forcing emulsion breaker into a flow line at a desired rate of flow.

A further object is to provide a device of this class which includes means for ease in manually recharging or filling the device with an emulsion breaker.

The present invention accomplishes these and other objects by providing a cylindrical housing horizontally divided by a piston wherein piston rods, connected with the piston, project vertically through the respective upper and lower ends of the housing for equalizing opposing end surface areas of the piston and raising the piston and filling that portion of the housing below the piston. Tubing and valve means interconnect the housing with the flow line.

Other objects will be apparent from the following description when taken in conjunction with the accompanying single sheet of drawings, wherein:

FIGURE 1 is a vertical cross-sectional view, partially in elevation, of the device supported above and connected with a fragment of a flow line;

FIGURE 2 is a similar vertical cross-sectional view, to a larger scale, of another embodiment of the device; and, FIGURE 3 is a view similar to FIG. 2 illustrating additional components which render the operation of the device substantially automatic.

Like characters of reference designate like parts in those figures of the drawings in which they occur.

In the drawings:

The reference numeral 10 generally indicates an emulsion breaking injecting apparatus mounted above a flow line 12 through which a fluid mixture from an oil well is pumped to a settling tank or oil and water separating apparatus, not shown. The device or apparatus 10 comprises a substantially cylindrical gas-tight housing having a wall 16 closed at its respective upper and lower ends by end plates 18 and 20 secured by flange bolts and nuts 22.

As shown in FIG. 1, legs 23 support the device 10 above the flow line 12. A piston 24, of relatively large mass when compared with the wall 16 and end plates 18 and 20, horizontally divides the housing to form upper and lower chambers 26 and 28, respectively. An O-ring 25 seals the piston with the inner surface of the housing wall. A piston rod 30 is coaxially connected in depending relation to the piston 24 and extends downwardly through the lower end plate 20.

Similarly a hollow or tubular piston rod 36, diametrically equal with respect to the piston rod 30, is coaxially connected to the upper end portion of the piston 24 and projects upwardly through the upper end plate 18. Thus the upper and lower surface areas of the piston 24 are equal. A filler valve 38 is connected to the upper free end of the piston rod 36. An O-ring 40 surrounds the respective piston rod and seals the latter with the respective end plate 18 and 20. A filler port or opening 42, communicating with the interior of the upper piston rod 36, extends angularly downwardly through the piston 24 for communication with the lower chamber 28.

A drain line 44 is connected, at one end, to the end plate 20 in communication with the lower chamber 28 and is connected at its other end for communication with the flow line 12. A valve, such as a sight-feed valve 46, is interposed in the drain line 44. Similarly a gas inlet and an exhaust line 48 is connected to the upper end plate 18 in communication with the upper chamber 26. A valve 50 opens and closes the free end of the line 48.

Referring more particularly to FIG. 2, the flow line 12 is provided with a T 52 or other suitable fitting which is in turn connected to the depending end of a vertically disposed cylindrical stand pipe or tank 54. The device 10 is connected to the tank 54 in spaced relation above the flow line 12 by brackets 56. The drain line 44 is connected, at its depending end, to the tank 54 so that it empties into the depending end portion of the tank 54. A check valve 58 is interposed in the line 44 between its connection with the tank 54 and the valve 46. A tube 60, connected with the gas inlet and exhaust line 48, is connected at its other end to the upper end portion of the tank 54. A control valve 62 is interposed in the tubing 60.

Referring to FIG. 3, the tube 60, connected at one end with the tank 54, is connected at its other end to one outlet of a three-way valve 64 having an exhaust outlet or port 65.

The three-way valve 64 is conventional and is spring loaded and provided with a gas actuated operating cylinder. The inlet and exhaust tube 48 is extended and connected to another outlet of the three-way valve 64. Other tubing 66 connects the gas actuated operating cylinder outlet of the three-way valve 64 to the tank 54 in spaced relation below the tube 60. A pilot valve 68 is interposed in the tubing 66. Bracket arms 70 and 72 are connected respectively to the upper and lower piston rods 36 and 30. The free end portions of the bracket arms are disposed in vertical alignment on the respective upper and lower sides of a control arm 74 which opens and closes the pilot valve 68 for the reasons more fully described hereinbelow. A check valve equipped filler line 75 communicates with the lower chamber 28 through the end plate 20.

In operation the device shown by FIG. 1 is positioned adjacent the flow line 12 and connected as described hereinabove. To initially fill the chamber 28 with emulsion breaker or oil treating chemical 76, the inlet and exhaust valve 50 and filler valve 38 are opened and the piston is manually raised by pushing upwardly on the piston rod 30. The emulsion breaker is then poured into and through the piston rod 36 so that the emulsion breaker enters the lower chamber 28 through the port 42. Air trapped in the lower chamber escapes through the port 42 as the emulsion breaker displaces it. After the chamber 28 is full, the valve 38 is closed. Gravitational attraction for the piston 24 exerts sufficient pressure on the emulsion breaker 76 to inject the latter into the flow line 12, through the tubing 44 with the rate of injection regulated by the sight-feed valve 46. In this embodiment, the gas exhaust and inlet valve 50 must be left open or partially open to admit air to the chamber 26.

Alternatively the valve 50 may be connected with an independent source of gas under pressure, not shown, to pressurize the upper chamber 26 and force feed the emulsion breaker.

The operation of the device shown in FIG. 2 is similar in most respects to the operation described for FIG. 1 with the exception that the tank 54 provides a reservoir of gas under pressure which has been produced by the oil well and has collected within the tank 54. In this embodiment the lower chamber 28 is filled with the emulsion breaker 76 by closing the valve 62 and opening the valve 50 and proceeding as described hereinabove for FIG. 1.

After the lower chamber 28 is filled the valve 50 is closed and the valve 62 reopened to admit gas under pressure from the tank 54 to the upper chamber 26 to equalize the pressure within the chamber 26 with the tank. Assuming, for example, that the tank 54 contains gas under a pressure of 100 p.s.i., then the chamber 26 contains the same pressure. Since the opposing end surface areas of the piston 24 are equal identical pressure is imposed, by the gas, against both ends of the piston but is unbalanced by the mass of the piston and its rods 30 and 36 resulting in a pressure on the chemical 76 of 102 p.s.i. This insures a positive feeding of the chemical 76 into the flow line regardless of fluctuations in a gas pressure within the tank 54 as a result of surging of the producing well.

Manual operation and filling of the lower chamber 28, as shown by the arrangement of components in FIG. 3, may be accomplished as described hereinabove for FIG. 2, however, the apparatus shown by FIG. 3 is intended to operate automatically as described hereinbelow.

The three-way valve 64 normally admits gas from the tank 54 to the upper chamber 26 through the open valve 62 and tubing 48 and 60 to equalize the gas pressure within the tank 54 and the upper chamber 26. As the emulsion breaker 76 is exhausted out of the lower chamber 28 the upper bracket 70 contacts the pilot valve control arm 74 admitting gas from the tank 54 to the cylinder of the three-way valve 64 which positions its ports to exhaust gas from the upper chamber 26 through the tubing 48 and three-way valve port 65. Emulsion breaker 76 under pressure from a supply, not shown, connected with the filler line 75, then flows into the lower chamber 28 through the valve equipped filler line 75. As the emulsion breaker 76 fills the lower chamber 28 it raises the piston 24 until the lower bracket arm 72 contacts the pilot valve control arm 74 to open the pilot valve 68 and apply gas pressure to the operating cylinder of the three-way valve 64 which then positions its ports so that gas pressure is again applied to the upper chamber 26 through the tubing 48 and 60 to complete the cycle. Gas pressure against respective ends of the piston 24 is similarly unbalanced in the manner described hereinabove for the device of FIG. 2.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In combination with a flow line through which a mixture of oil, gas and water is pumped and wherein the flow line has a horizontally extending portion; a cylindrical gas-tight housing vertically positioned above said flow line; a drain line connected with the lower end portion of said housing and extending downwardly and communicating with said flow line; a piston dividing said housing to form an upper gas containing chamber and a lower emulsion breaker containing chamber; an upper tubular piston rod vertically connected with said piston and extending upwardly from said housing through the upper end thereof; a lower piston rod, diametrically equal with said upper piston rod, connected with said piston and extending downwardly through the lower end of said housing, a feed valve interposed in said drain line for regulating the flow of emulsion breaker therethrough, a gas-tank connected with and communicating with said flow line; and tubing interconnecting the upper end of said tank with the upper end of said housing for communication between said tank and said upper chamber, for equalizing gas pressure applied to respective ends of said piston.

2. The combination as claimed in claim 1 in which said piston is provided with a port communicating, at one end, with the interior of said upper piston rod and communicating at its other end with the lower chamber of said housing.

3. The combination as claimed in claim 1, including, a check valve equipped filler line connecting a source of emulsion breaker under pressure with said lower chamber; a three-way valve interposed in the tubing connecting the upper end of said tank with said housing; other tubing connected at one end with said tank and connected at its other end with said three-way valve; a pilot valve having a control arm interposed in said other tubing; and bracket arms connected in aligned relation with said upper and lower piston rods, respectively, for contacting said control arm and opening and closing said pilot valve in response to movement of said piston beyond a predetermined limit, within said housing.

References Cited

UNITED STATES PATENTS

| | | | |
|---|---|---|---|
| 549,479 | 11/1895 | Hall | 137—564.5 |
| 833,045 | 10/1906 | Graese | 137—564.5 |
| 1,241,551 | 10/1917 | Preston et al. | 137—564.5 |
| 2,563,211 | 8/1951 | Cassesse | 137—564.5 |
| 3,109,452 | 11/1963 | Hicks, Jr. | 137—564.5 |

M. CARY NELSON, *Primary Examiner.*

W. CLINE, *Assistant Examiner.*